US011860942B1

(12) United States Patent
Baluch et al.

(10) Patent No.: US 11,860,942 B1
(45) Date of Patent: Jan. 2, 2024

(54) PREDICTIVE LOADING AND UNLOADING OF CUSTOMER DATA IN MEMORY

(71) Applicant: Amazon Technologies, Inc., Seattle, WA (US)

(72) Inventors: Omer Baluch, Seattle, WA (US); Julio Delgado Mangas, Redmond, WA (US); Kiran-Kumar Muniswamy Reddy, Sammamish, WA (US); Ajay Gopalakrishnan, Bellevue, WA (US); Antoun Joubran Kanawati, Seattle, WA (US); Si Yin, Seattle, WA (US); Mukul Vijay Karnik, Redmond, WA (US); Vishal Parakh, Seattle, WA (US); Timothy Andrew Rath, Des Moines, WA (US); Bhupinder Singh Sidana, Kenmore, WA (US); Jared Scott Lundell, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 476 days.

(21) Appl. No.: 15/595,688

(22) Filed: May 15, 2017

(51) Int. Cl.
*G06F 16/9032* (2019.01)
*G06N 20/00* (2019.01)
(Continued)

(52) U.S. Cl.
CPC ........ *G06F 16/90324* (2019.01); *G06F 16/33* (2019.01); *G06F 16/355* (2019.01);
(Continued)

(58) Field of Classification Search
CPC ........ G06F 16/955; G06F 16/33; G06F 16/48; G06F 16/90324; G06F 16/355; G06N 20/00; G06N 5/01
(Continued)

(56) References Cited

U.S. PATENT DOCUMENTS 8,347,302 B1 * 1/2013 Vincent ................. G06F 9/5011
718/104
9,015,159 B1 * 4/2015 Page ................... G06Q 30/0241
707/736
(Continued)

OTHER PUBLICATIONS

Sunil, Ray, "Commonly used Machine Learing Algorithms (with Pyton and R Codes)", http://www.analyticsvidhya.com/blog/2015/08/common-machine-learing-algorithms/, originally published on Aug. 10, 2015, and updated on Sep. 9, 2017, 60 pages.
(Continued)

*Primary Examiner* — Robert Stevens
(74) *Attorney, Agent, or Firm* — Lowenstein Sandler LLP

(57) ABSTRACT

Prediction logic analyzes previous data usage activities of a customer process running on a host machine to generate a first prediction indicating that the customer process will request a first data set at a first time. The prediction logic retrieves the first data set from long-term storage and loads the first data set into memory on the host machine in advance of the first time in order to provide the customer process with access to first data set in the memory during a period between the first time and a second time. The prediction logic further generates a second prediction indicating that the customer process will not access the first data set for a threshold period of time after the second time and stores the first data set in the long-term storage at the second time.

13 Claims, 8 Drawing Sheets

(51) Int. Cl.
  *G06F 16/33* (2019.01)
  *G06F 16/48* (2019.01)
  *G06F 16/35* (2019.01)
  *G06F 16/955* (2019.01)
  *G06N 5/01* (2023.01)

(52) U.S. Cl.
  CPC ............ *G06F 16/48* (2019.01); *G06F 16/955* (2019.01); *G06N 5/01* (2023.01); *G06N 20/00* (2019.01)

(58) Field of Classification Search
  USPC .......................................................... 707/737
  See application file for complete search history.

(56) References Cited

U.S. PATENT DOCUMENTS

| | | | |
|---|---|---|---|
| 9,171,310 B2* | 10/2015 | Miller | G06Q 30/02 |
| 9,244,931 B2* | 1/2016 | Radinsky | G06N 20/00 |
| 9,473,743 B2* | 10/2016 | Diot | H04N 7/17318 |
| 9,769,030 B1 | 9/2017 | Ramalingam | H04L 41/22 |
| 9,819,567 B1 | 11/2017 | Uppal | H04L 45/22 |
| 9,916,544 B2 | 3/2018 | Lee | G06Q 50/14 |
| 10,083,094 B1 | 9/2018 | Thomas | G06F 11/1466 |
| 10,083,411 B2 | 9/2018 | Kinsey, II | G06Q 10/063116 |
| 10,311,372 B1 | 6/2019 | Hotchkies | H04L 67/1097 |
| 10,558,923 B1 | 2/2020 | Kenthapadi | G06N 7/005 |
| 10,673,952 B1 | 6/2020 | Cohen | G06F 9/45558 |
| 2003/0216971 A1* | 11/2003 | Sick | G01D 4/004 |
| | | | 705/7.36 |
| 2006/0088004 A1* | 4/2006 | Casey | H04L 67/18 |
| | | | 370/329 |
| 2007/0156673 A1* | 7/2007 | Maga | G06Q 30/02 |
| | | | 707/999.005 |
| 2007/0185867 A1* | 8/2007 | Maga | G06Q 30/02 |
| 2010/0057560 A1* | 3/2010 | Skudlark | H04N 21/812 |
| | | | 705/14.49 |
| 2010/0179987 A1* | 7/2010 | Sebastian | H04L 45/7453 |
| | | | 709/203 |
| 2011/0078141 A1* | 3/2011 | Fakeih | G06F 16/258 |
| | | | 707/736 |
| 2013/0018821 A1* | 1/2013 | Shao | G06Q 50/06 |
| | | | 705/412 |
| 2014/0019443 A1* | 1/2014 | Golshan | G06F 16/24578 |
| | | | 707/723 |
| 2014/0080428 A1* | 3/2014 | Rhoads | G06F 16/58 |
| | | | 455/88 |
| 2014/0136280 A1* | 5/2014 | Farahat | G06Q 30/0202 |
| | | | 705/7.31 |
| 2015/0286741 A1* | 10/2015 | Zhu | G06F 16/955 |
| | | | 707/736 |
| 2015/0358236 A1* | 12/2015 | Roach | H04L 41/0896 |
| | | | 370/235 |
| 2016/0224897 A1* | 8/2016 | Wang | G06N 5/022 |
| 2016/0277970 A1* | 9/2016 | Werneke | G06F 9/50 |
| 2017/0142110 A1* | 5/2017 | Browne | G06Q 20/40 |
| 2018/0004783 A1* | 1/2018 | Mehrotra | G06F 16/9537 |
| 2018/0039899 A1* | 2/2018 | Biemueller | G06F 9/45533 |
| 2018/0084074 A1* | 3/2018 | Juneja | G06F 16/951 |
| 2018/0096250 A1* | 4/2018 | Rickard, Jr. | G06Q 30/0204 |
| 2018/0173755 A1* | 6/2018 | Xia | G06F 16/24537 |
| 2018/0260124 A1* | 9/2018 | Schucker | G06F 11/1469 |
| 2018/0307723 A1* | 10/2018 | Bhargava | G06F 16/2457 |
| 2018/0316571 A1* | 11/2018 | Andrade | G06Q 10/101 |
| 2018/0329735 A1* | 11/2018 | Liu | G06F 9/45558 |
| 2019/0261199 A1* | 8/2019 | Salkintzis | H04W 28/10 |

OTHER PUBLICATIONS

Le, James, "The 10 Algorithms Machine Learning Engineers Need to Know", http://www.kdnuggets.com/2016/08/10-algorithms-machine-learning-engineers.html, 8 pages.

* cited by examiner

US 11,860,942 B1

PREDICTIVE LOADING AND UNLOADING OF CUSTOMER DATA IN MEMORY

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Embodiments are described for predictive loading and unloading of customer data in memory. In one embodiment, prediction logic running on a storage node, or on a management node connected to a plurality of storage nodes over a network (e.g., in a data center), tracks historical customer usage data for containers holding specific data sets and can use this data to predict when to load and unload containers based on usage patterns. This technique allows the prediction logic to make efficient use of resources on the individual storage nodes (e.g., processing power, memory, bandwidth) by unloading containers out of memory and into long term storage (e.g., SSD disk), while also reloading the containers into memory shortly before customers are likely to use them. By predictively loading the containers into memory in advance of a time when the user is expected to access the associated data sets, the prediction logic can decrease or minimize initial query latencies. This can help cloud computing services that utilize the data to host more customers concurrently on the same computing resources, while still meeting defined service level agreements for customer queries.

In one embodiment, tracking historical customer usage and predicting future usage can allow the prediction logic to make better decisions on where to place customer containers. Certain data sets can be placed on different storage nodes in order to distribute data sets that are typically accessed at the same time. An example placement on a single storage node would be a mix of customer data sets that are typically accessed during the day and other data sets that are typically accessed at night. This can improve or optimize the use of hardware resources on individual storage nodes. For example, if a first customer usually runs queries on a data set between 9 am and 3 pm, after a few days of gathering usage data, the prediction logic can predictively load this customer's data set from long term storage into memory at 8:45 am and then unload it at 3:30 pm. This can free up resources on the storage node for customers that tend to generate their reports in the evening, or customers that are in other time zones that have different work hours.

Figure 1:
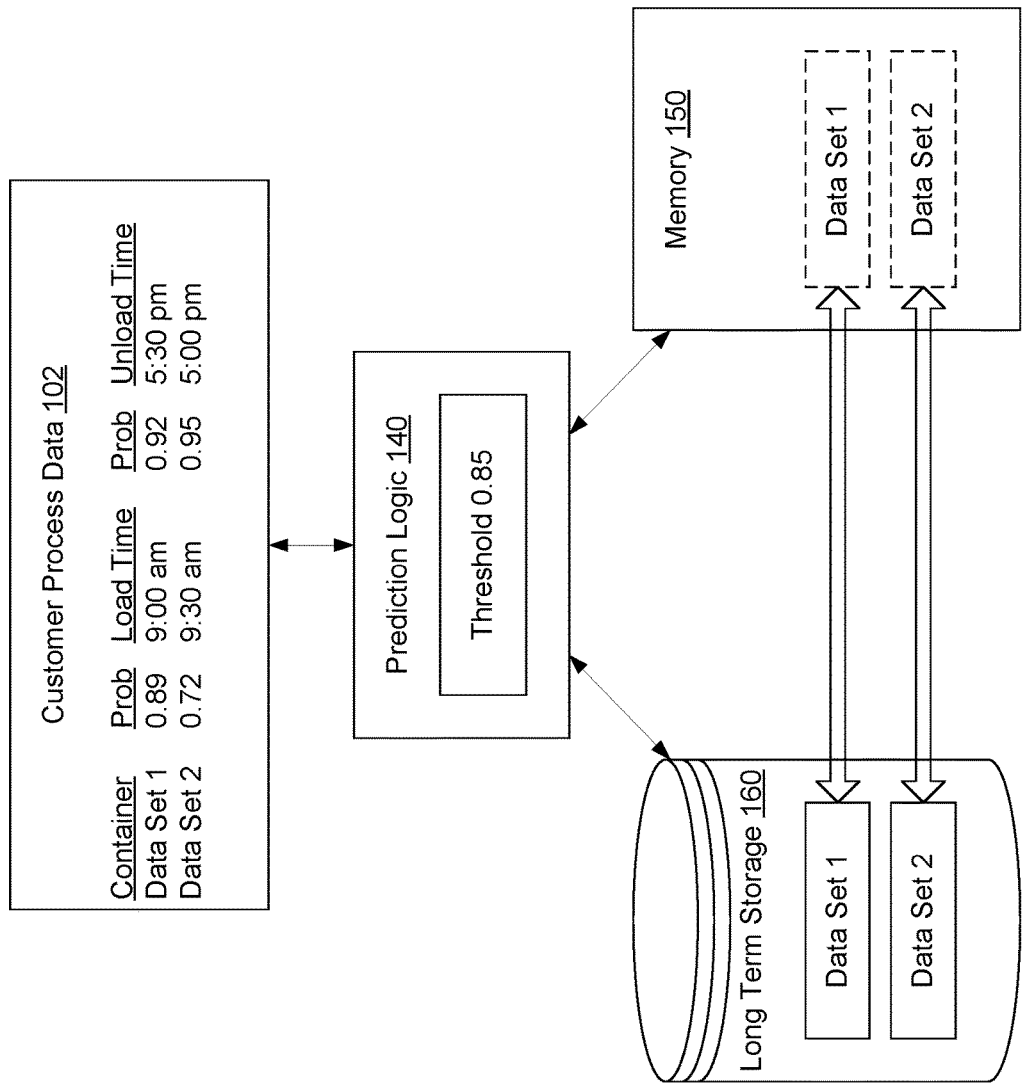
FIG. 1 is a block diagram illustrating predictive loading and unloading of customer data in memory, according to an embodiment.

FIG. 1 is a block diagram illustrating predictive loading and unloading of customer data in memory, according to an embodiment. In one embodiment, a cloud computing service may include one or more separate customer processes which are executed on behalf of remote customers. The customer processes may access particular data sets, stored in individual containers, in response to requests from the customers or according to a defined schedule. In one embodiment, prediction logic 140 captures previous data usage activities of a customer process with respect to various data sets accessed by the customer process. For example, the previous data usage activities may include times when previous requests for data sets were made, times when queries were submitted against the data sets, times representing how long the queries took to execute, etc. Depending on the embodiment, prediction logic 140 may run on an individual storage node in a data center, on a management node in the data center, on an individual computing device (e.g., a terminal, personal computer, mobile device) or in some other location. Prediction logic 140 may maintain a collection of customer process data 102. In a raw form, the customer process data may include an indication of the previous data usage activities described above. In one embodiment, prediction logic 140 analyzes the previous data usage activities to determine when a particular customer process is likely to access a certain data set as well as a probability that the customer process will access the data set at that time. Similarly, the prediction logic 140 may also determine when the customer process is no longer likely to access the data set for a threshold period of time and a corresponding probability of that prediction being correct. Customer process data 102 in FIG. 1 illustrates the results of this analysis in tabular form including an indication of the container/data set, a first probability and load time, and a second probability and unload time. In other embodiments, prediction logic 140 may analyze the data usage activities to determine other data and/or may store or organize the data in some other manner.

In one embodiment, prediction logic 140 also maintains a threshold defining how high the corresponding probability value should be before a data set is loaded from long term storage 160 to memory 150 or unloaded from memory 150 back to long term storage 160. In one embodiment, the threshold is defined according to one or more load conditions on the storage node (e.g., a host machine). This threshold may vary depending on certain factors including the day of the week, the time of day, a number of customer processes being executed on the host machine, a volume of queries being submitted on the host machine, etc. In addition, certain processes or data sets may be given priority over other processes or data sets and thus, have may a lower associated threshold.

In one embodiment, as a load time (e.g., 9:00 am) of a given data set (e.g., Data Set 1) is approaching, prediction logic 140 may compare the corresponding probability (e.g., 0.89) to the current threshold (e.g., 0.85). Since the probability meets or exceeds the threshold, prediction logic 140 may retrieve Data Set 1 from long term storage 160 and load Data Set 1 into memory 150 in advance of 9:00 am. As a load time (e.g., 9:30) of a second data set (e.g., Data Set 2) is approaching, prediction logic 140 may determine that the corresponding probability (e.g., 0.72) is not higher than the threshold (e.g., 0.85). As a result, prediction logic 140 may not load Data Set 2 into memory 150 and may instead wait until a specific request to access Data Set 2 is received before retrieving Data Set 2 from long term storage 160. In another embodiment, when an unload time (e.g., 5:30 pm) is approaching, prediction logic 140 may compare the corresponding probability (e.g., 0.92) to the current threshold. By this time, the threshold may have changed to accommodate for different load conditions on the storage node. If the probability exceeds the threshold, prediction logic 140 may unload Data Set 1 from memory 150 and return Data Set 1 to long term storage 160. In certain situations, historical usage data is not always a completely accurate predictor of future performance. For example, despite fairly regular historical usage patterns, something may change and cause a customer begin requesting access to their data at different times. In one embodiment, a customer may make an abnormal request for data access that does not fit their past or future usage patterns. In these cases, prediction logic 140 may not always be able to load a customer data set in advance of recieiving a request. As a result, their may be some latency in loading the data set into memory from long term storage and the customer may experience a delay. Additional details of these predictive loading and unloading techniques are described below.

Figure 2:
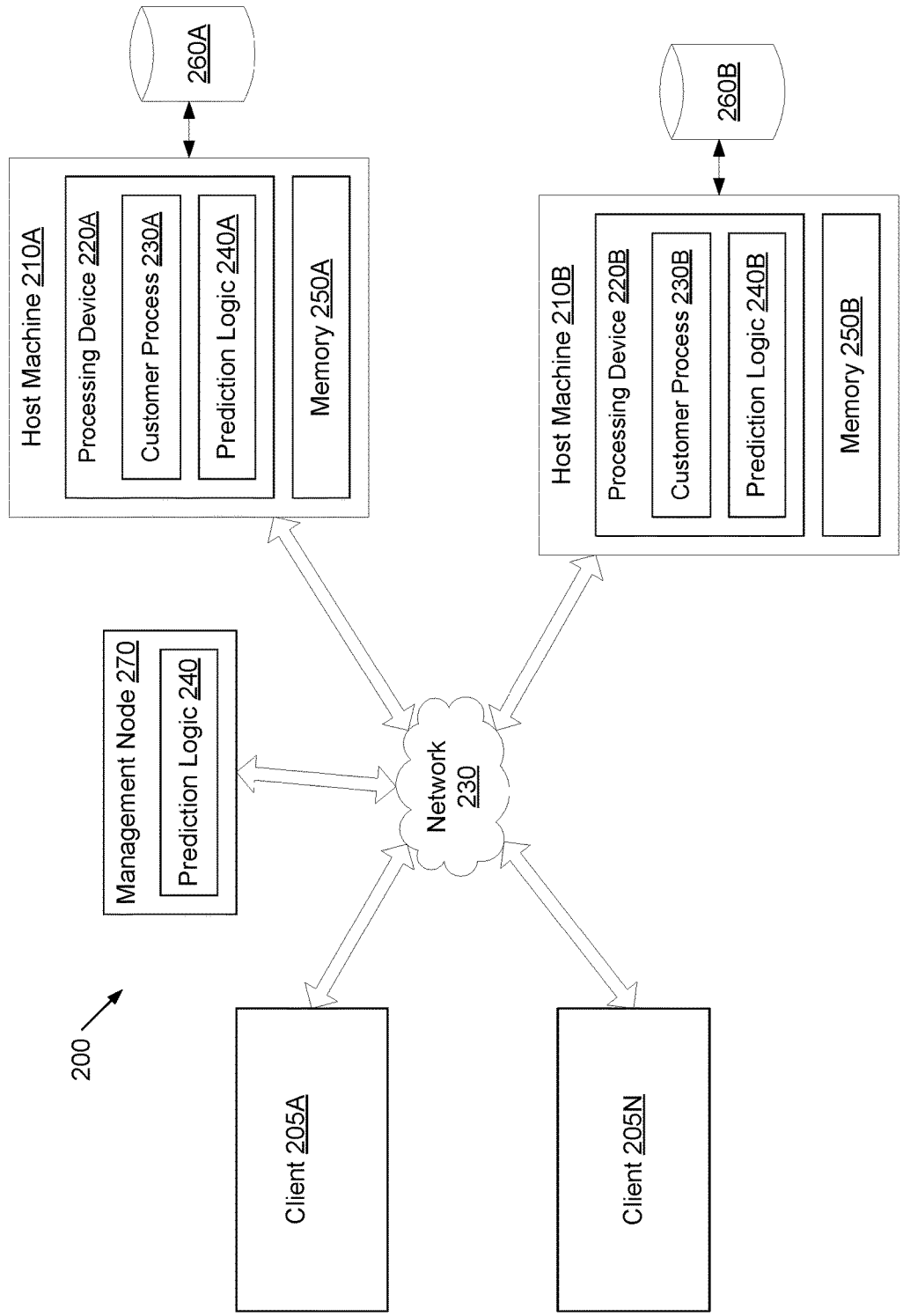
FIG. 2 is a block diagram of an exemplary network architecture, in which embodiments of the present disclosure may operate.

FIG. 2 is a block diagram of an exemplary network architecture 200, in which embodiments of the present disclosure may operate. In one embodiment, the network architecture 200 includes one or more host machines 210A-210B, which may be employed to provide cloud computing services to one or more client devices 205A-205N. The client devices 205A-205N may communicate with host machines 210A-210B via one or more networks 230. Client devices 205A-205N are representative of any number of clients which may communicate with host machines 210A-210B for storing and accessing data in network architecture 200. Client devices 205A-205N are representative of any number of stationary or mobile computers such as desktop personal computers (PCs), servers, server farms, workstations, laptops, handheld computers, servers, personal digital assistants (PDAs), smart phones, and so forth. It is noted that some systems may include only a single client device, connected directly or remotely, to host machines 210A-210B.

In alternative embodiments, the number and type of client devices, host machines, and data storage devices is not limited to those shown in FIG. 2. At various times one or more clients may operate offline. In addition, during operation, individual client device connection types may change as users connect, disconnect, and reconnect to network architecture 200. Further, the systems and methods described herein may be applied to directly attached computing systems or network attached computing systems and may include a host operating system configured to perform one or more aspects of the described methods. Numerous such alternatives are possible and are contemplated.

In one embodiment, network 230 may utilize a variety of techniques including wireless connections, direct local area network (LAN) connections, wide area network (WAN) connections such as the Internet, a router, storage area network, Ethernet, and others. Network 230 may comprise one or more LANs that may also be wireless. Network 230 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 230. The network 230 may interface with a set of communications protocols used for the Internet such as the Transmission Control Protocol (TCP) and the Internet Protocol (IP), or TCP/IP.

In one embodiment, each host machine 210A-210B may be associated with one or more data storage devices 260A-260B. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 210A-210B may each include one or more processing devices 220A-220B, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 250A-250B and a storage device 260A-260B. Each of processing devices 220A-220B are configured to execute instructions of one or more customer processes 230A-230B and an instance of prediction logic 240A-240B.

In one embodiment, network architecture 200 further includes management node 270. Management node 270 may be a standalone machine connected to host machines 210A-210B via network 230 or may be distributed across two or more physical machines, including host machines 210A-210B and/or other machines. In one embodiment, management node 270 also includes an instance of prediction logic 240. Prediction logic 240 may have a higher level view of previous data usage activities and load conditions across all host machines connected to network 230. The instances of prediction logic 240A-240B on individual host machines 210A-210B may only be able to observe data usage activities and load conditions on that respective host machine. The higher level view of prediction logic 240 on management node 270 can enable deeper analysis of network data and allow for global decisioning making with respect to predictive loading and unloading.

In one embodiment, prediction logic 240 is further aware of and responsible for managing multiple replicas of a data set stored across different host machines. For example, prediction logic 240 may receive captured data usage activities of a first customer process 230A, running on a first host machine 210A, with respect to a first replica of a data set stored on the first host machine 210A, receive captured data usage activities of a second customer process 230A, running on a second host machine 210B, with respect to a second replica of the data set stored on the second host machine 210B and generate a first prediction based on the captured data usage activities with respect to the first and second replicas of the data set. In one embodiment, the first and second replicas include identical copies of the same data that are stored on separate host machines for purposes of reliability, fault-tolerance and accessibility.

Figure 3:
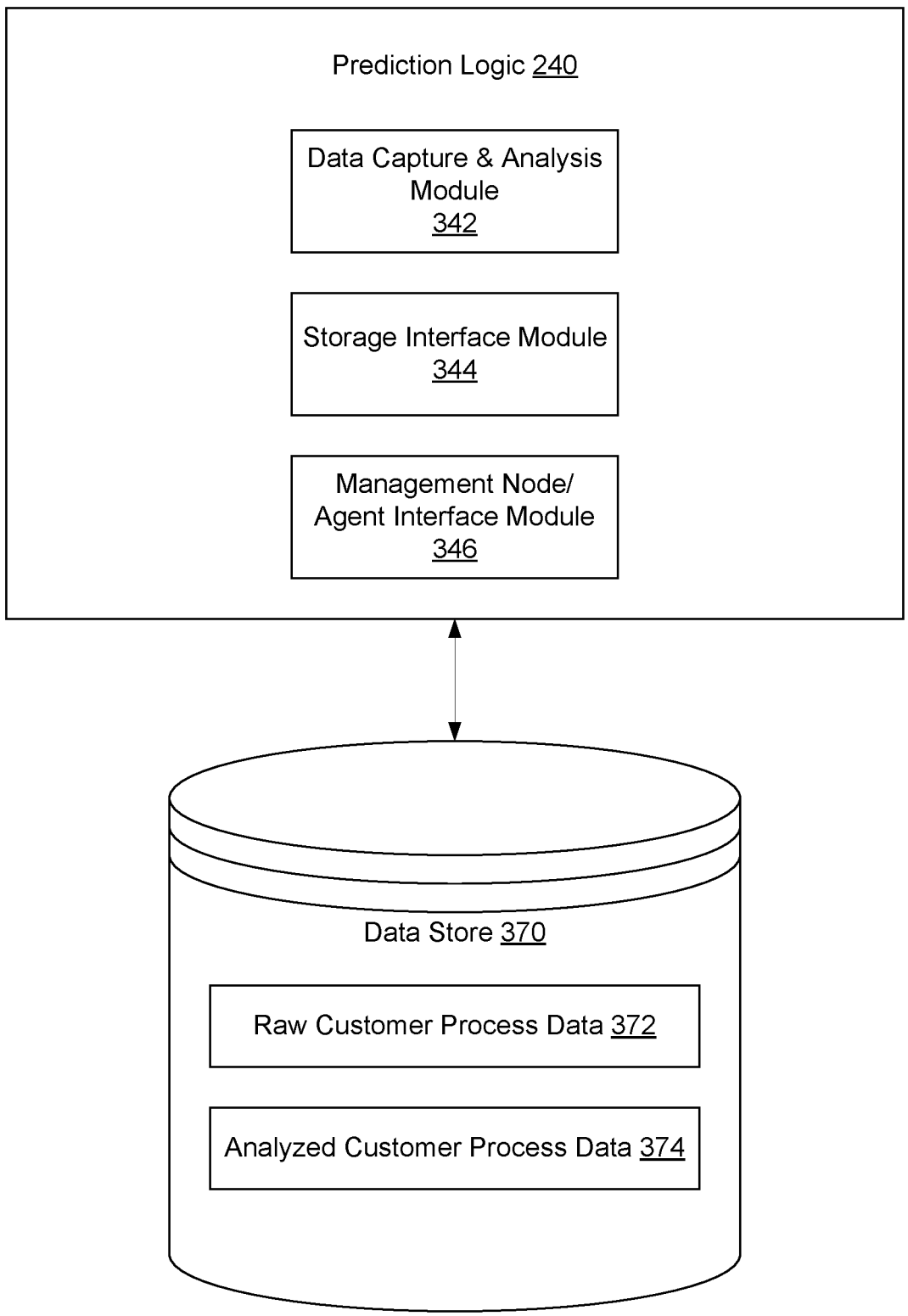
FIG. 3 is a block diagram illustrating prediction logic, according to an embodiment.

FIG. 3 is a block diagram illustrating prediction logic, according to an embodiment. In one embodiment, prediction logic 240 includes data capture and analysis module 342, storage interface module 344 and management node/agent interface module 346. This arrangement of modules and components may be a logical separation, and in other embodiments, these modules or other components can be combined together or separated in further components, according to a particular implementation. The embodiment of prediction logic 240 illustrated in FIG. 3 may be representative of any instances of prediction logic 140, 240, 240A or 240B, discussed above with respect to FIGS. 1 and 2. In one embodiment, data store 370 is connected to prediction logic 240 and includes raw customer process data 372 and analyzed customer process data 374. In one implementation, one of host machines 210A-210B or management node 270 may include both prediction logic 240 and data store 370. In another embodiment, data store 370 may be external to host machines 210A-210B or management node 270, and may be connected over a network or other connection. In other implementations, host machines 210A-210B or management node 270 may include different and/or additional components and applications which are not shown to simplify the description. Data store 370 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, data capture and analysis module 342 captures previous data usage activities of customer processes with respect to various data sets accessed by the customer processes. In one embodiment, data capture and analysis module 342 may monitor activities on an individual host machine or storage node, or on multiple host machines, if prediction logic 240 is running on a management node 270. Data capture and analysis module 342 may log a history of data usage activities and store them as raw customer process data 372. For example, the previous data usage activities may include times when previous requests for data sets were made, times when queries were submitted against the data sets, times representing how long the queries took to execute, etc. In one embodiment, data capture and analysis module 342 analyzes the previous data usage activities, using machine learning, to determine when a particular customer process is likely to access a certain data set as well as a probability that the customer process will access the data set at that time. Similarly, data capture and analysis module 342 may also determine when the customer process is no longer likely to access the data set for a threshold period of time and a corresponding probability of that prediction being correct. In one embodiment, data capture and analysis module 342 stores these results as analyzed customer process data 374. Customer process data 102 in FIG. 1 may be one example of analyzed customer process data 374 stored in a table including an indication of the container/data set, a first probability and load time, and a second probability and unload time. In other embodiments, data capture and analysis module 342 may analyze the data usage activities to determine other data and/or may store or organize the data in some other manner.

In one embodiment, data capture and analysis module 342 also maintains a threshold defining how high the corresponding probability value should be before a data set is loaded or unloaded between long term storage and memory. In one embodiment, the threshold is defined according to one or more load conditions on the storage node (e.g., a host machine). This threshold may vary depending on certain factors including the day of the week, the time of day, a number of customer processes being executed on the host machine, a volume of queries being submitted on the host machine, etc. In addition, certain processes or data sets may be given priority over other processes or data sets and thus, have may a different associated threshold. As a load or unload time is approaching, data capture and analysis module 342 can compare the probability from analyzed customer process data 374 to the current threshold to determine whether to take action. If the probability meets or exceeds the threshold, data capture and analysis module 342 can instruct storage interface module 344 to load or unload the corresponding data set as appropriate.

In one embodiment, storage interface module 344 receives instructions from data capture and analysis module 342 to load data sets from long term storage to memory or to unload data sets from memory to long term storage. In response to receiving those instructions storage interface module 344 can take the appropriate corresponding action. For example, in one embodiment, as the load time 9:00 am for Data Set 1 is approaching, data capture and analysis module 342 compares the corresponding probability (e.g., 0.89) to the current threshold (e.g., 0.85). Since the probability meets or exceeds the threshold, storage interface module 344 may retrieve Data Set 1 from long term storage and load Data Set 1 into memory in advance of 9:00 am. In one embodiment, storage interface module 344 may identify the appropriate data set in long term storage using a unique customer number or unique identifier.

In one embodiment, management node/agent interface module 346 facilitates interaction between the host machine and management node 270 (if present in network architecture 200). In one embodiment, where prediction logic 240 resides on management node 270, a prediction agent may reside on each of host machines 210A-210B. This agent may provide information to prediction logic 240 and management node/agent interface module 346 may receive captured data usage activities of customer processes 230A-230B from the agent on each corresponding host machine 210A-210B. Similarly, upon analyzing the data usage activities, management node/agent interface module 346 may send a command to the agent on one of host machines 210A-210B instructing those host machines to load or unload a particular data set, as appropriate.

Figure 4:
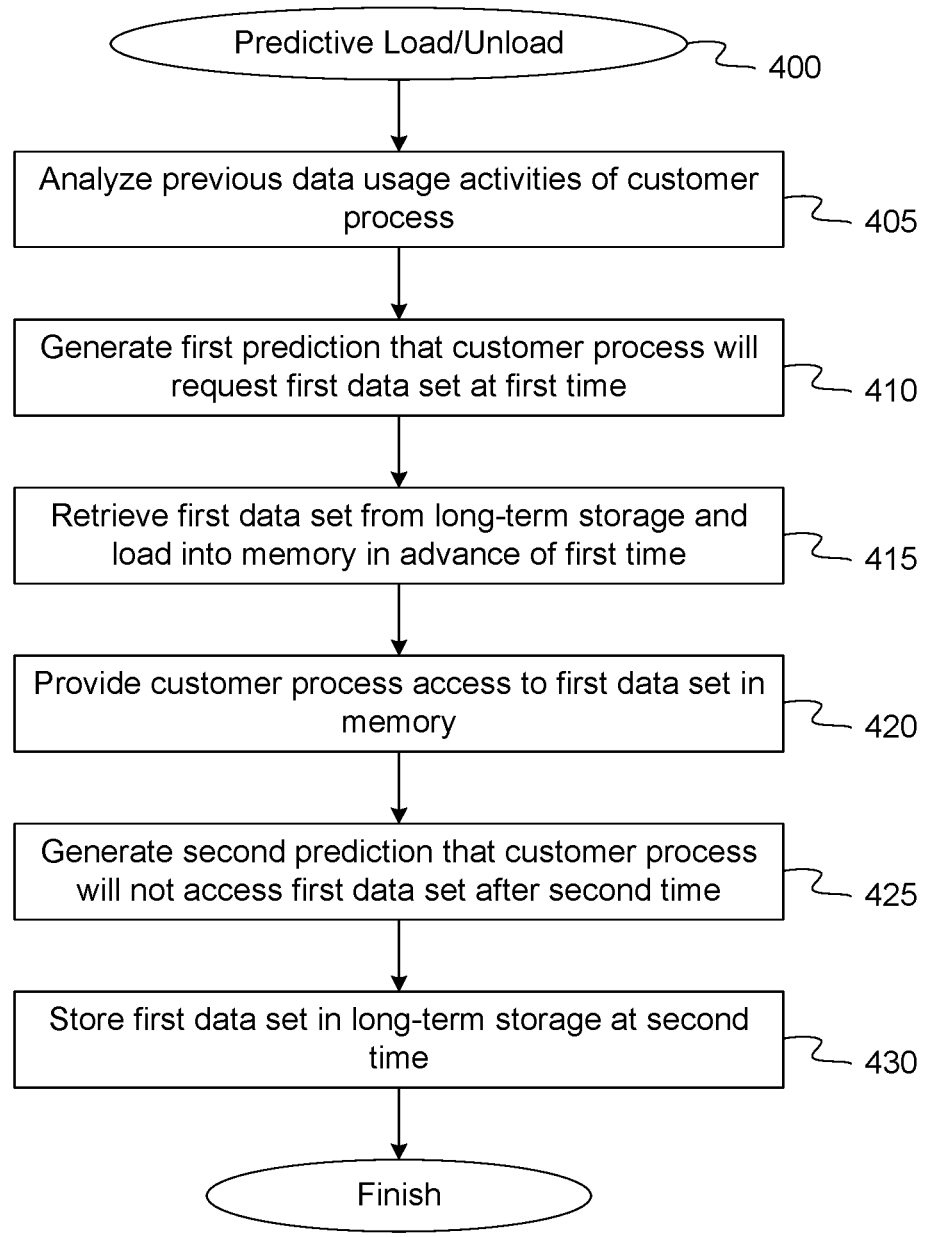
FIG. 4 is a flow diagram illustrating a method of predictive loading and unloading of customer data in memory, according to an embodiment.

FIG. 4 is a flow diagram illustrating a method of predictive loading and unloading of customer data in memory, according to an embodiment. The method 400 may be performed by processing logic that comprises hardware (e.g., circuitry, dedicated logic, programmable logic, microcode, etc.), software, firmware, or a combination thereof. The processing logic is configured to predictively load a data set from long term storage into memory before a corresponding customer process will request to access the data set and to unload the data set from memory back into long term storage once it is predicted that the customer process will no longer utilize the data set for some period of time. In one embodiment, method 400 may be performed by prediction logic 240, as shown in FIG. 3.

Referring to FIG. 4, at block 405, method 400 analyzes previous data usage activities of a customer process. In one embodiment, data capture and analysis module 342 analyzes raw customer process data 372 to identify trends, clusters, patterns, etc. associated with a customer process and a particular data set. In one embodiment, data capture and analysis module 342 uses machine learning techniques to perform the analysis. These techniques can include, for example, a cluster analysis algorithm, a self-organizing map, linear regression, logistic regression, a decision tree, SVM, Naive Bayes, KNN, K-Means, Random Forest, Dimensionality Reduction Algorithms, Gradient Boost & Adaboost, etc.

At block 410, method 400 generates a first prediction that the customer process will request a first data set at a first time. In one embodiment, data capture and analysis module 342 generates analyzed customer process data 374 which includes a load time, when a certain customer process 230A will likely request access to a particular data set stored in long-term storage 260A on host machine 210A. The prediction may further include a value indicating a probability that the prediction is correct. In one embodiment, the prediction is based on the previous data usage activities of the customer process. For example, if on a certain percentage of days over the past week or month, a customer process has begun running queries against Data Set 1 at approximately 9:15 am, data capture and analysis module 342 can conclude that the customer process will continue to access Data Set 1 at the same time going forward. In one embodiment, data capture and analysis module 342 assign a higher weighting value to data usage activities that occurred more recently than older data usage activities when determining the first value. In this manner, the more recent activities are given greater importance since they are more likely to be indicative of future data usage activities.

At block 415, method 400 retrieves the first data set from long term storage and loads the first data set into memory on the host machine in advance of the first time. In one embodiment, storage interface module 344 may receive instructions from data capture and analysis module 342 and in response, may identify Data Set 1 in long-term storage 260A. In one embodiment, storage interface module 344 may retrieve Data Set 1 a fixed period of time in advance of the predicted load time (e.g., 5 minutes, 10 minutes, 15 minutes, 30 minutes) to ensure that the data set is available in memory 250A when requested by the customer process. In another embodiment, the period of time in advance of the predicted load time may be based on the statistical distribution of load times in the historical usage data (e.g., based on the earliest load time, standard deviation, percentiles, etc.).

At block 420, method 400 provides the customer process with access to the first data set in the memory during a period between the first time and a second time. While Data Set 1 is in memory 250A, customer process 230A can request, run queries against, or otherwise access Data Set 1 with minimal latency due to the operating speed and location of memory 250A. Storage interface module 344 may maintain Data Set 1 in memory 250A until the second time, which is indicative of when the customer process 230A is no longer likely to access Data Set 1.

At block 425, method 400 generates a second prediction indicating that the customer process will not access the first data set for a threshold period of time after the second time. In one embodiment, analyzed customer process data 374 further includes an unload time, when customer process 230A will likely stop requesting access to a particular data set in memory 250A. The prediction may further include a value indicating a probability that the prediction is correct. As described above, the prediction is based on the previous data usage activities of the customer process. For example, if on a certain percentage of days over the past week or month, the customer process no longer runs queries against Data Set 1 after approximately 5:30 pm, data capture and analysis module 342 can conclude that the customer process will continue to stop accessing Data Set 1 at the same time going forward. In one embodiment, the threshold period of time is a configurable value indicating how long it will be between data access requests. The threshold period of time can be for example, 1 hour, 4 hours, 12 hours, until the next calendar day, until next week, etc.

At block 430, method 400 stores the first data set in the long term storage at the second time. In one embodiment, storage interface module 344 may receive instructions from data capture and analysis module 342 and in response, may identify Data Set 1 in memory 250A. Storage interface module 344 unloads Data Set 1 from memory 250A back into long term storage 260A. If any changes were made to Data Set 1 while Data Set 1 was stored in memory 250A, those changes may be maintained in the version of Data Set 1 stored in long-term storage 260A.

Figure 5:
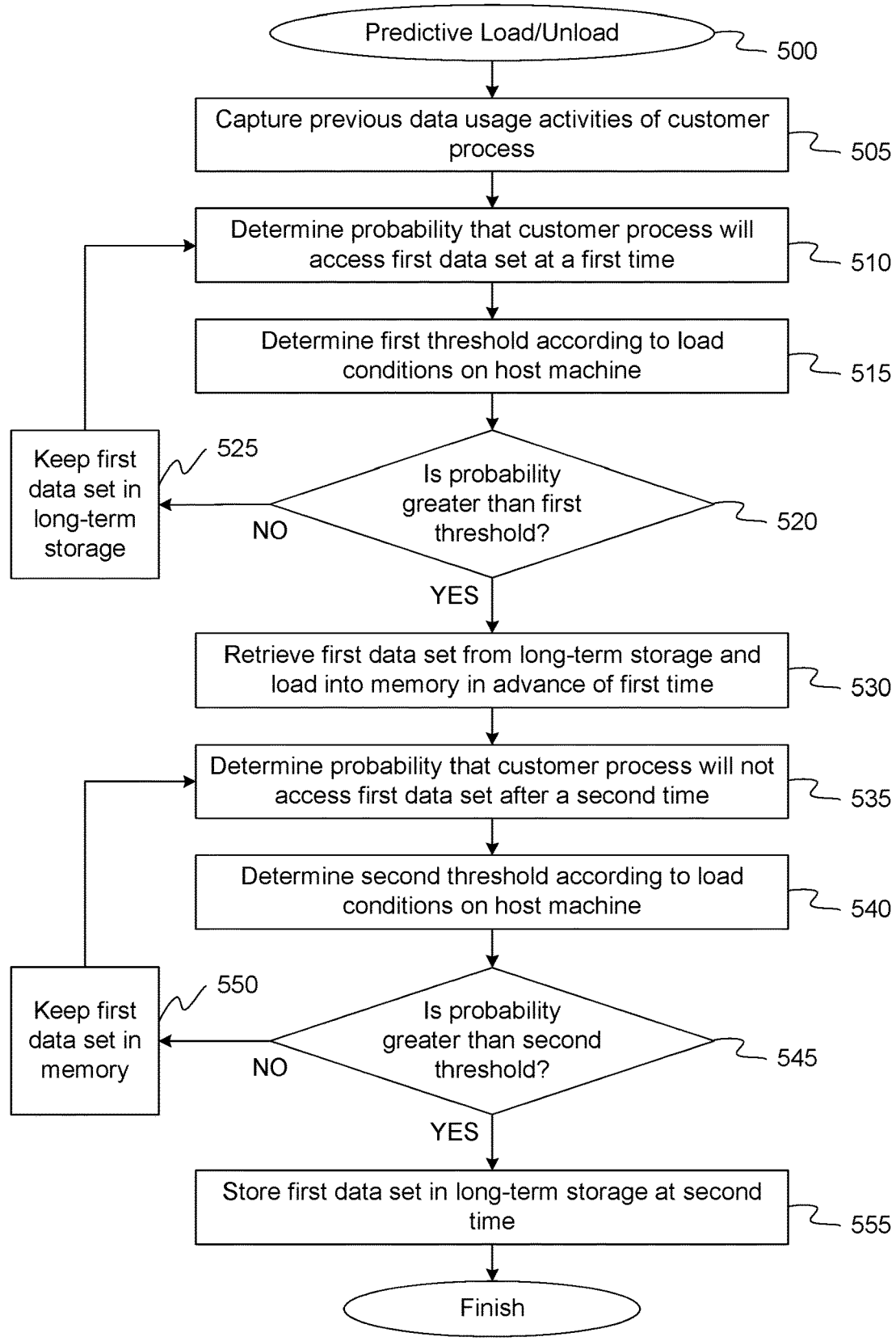
FIG. 5 is a flow diagram illustrating method of predictive loading and unloading of customer data in memory, according to an embodiment.

FIG. 5 is a flow diagram illustrating a method of predictive loading and unloading of customer data in memory, according to an embodiment. The method 500 may be performed by processing logic that comprises hardware (e.g., circuitry, dedicated logic, programmable logic, microcode, etc.), software, firmware, or a combination thereof. The processing logic is configured to predictively load a data set from long term storage into memory before a corresponding customer process will request to access the data set and to unload the data set from memory back into long term storage once it is predicted that the customer process will no longer utilize the data set for some period of time. In one embodiment, method 500 may be performed by prediction logic 240, as shown in FIG. 3.

Referring to FIG. 5, at block 505, method 500 captures previous data usage activities of a customer process with respect to a first data set. In one embodiment, data capture and analysis module 342 captures previous data usage activities of customer process 230A with respect to Data Set 1. In one embodiment, data capture and analysis module 342 may monitor activities on individual host machine 210A may log a history of data usage activities and store them as raw customer process data 372. For example, the previous data usage activities may include times when previous requests for data sets were made, times when queries were submitted against the data sets, times representing how long the queries took to execute, etc.

At block 510, method 500 determines a first value representing a probability that a customer process, running on a host machine, will access the first data set at a first time. In one embodiment, data capture and analysis module 342 analyzes the previous data usage activities, using machine learning, to determine when customer process 230A is likely to access Data Set 1 as well as a probability that customer process 230A will in fact access Data Set 1 at that time. Additional details of the machine learning process used for probability determination are provided below with respect to FIG. 6.

At block 515, method 500 determines a first threshold according to one or more load conditions on the host machine. In one embodiment, data capture and analysis module 342 maintains a threshold defining how high the probability value should be before a corresponding data set is loaded from long term storage 260A to memory 250A or unloaded from memory 250A back to long term storage 260A. In one embodiment, the threshold is defined according to one or more load conditions on host machine 210A. This threshold may vary depending on certain factors including the day of the week, the time of day, a number of customer processes being executed on the host machine, a volume of queries being submitted on the host machine, etc. In addition, certain processes or data sets may be given priority over other processes or data sets and thus, have may a different associated threshold.

At block 520, method 500 determines whether the first value representing the probability is greater than the first threshold. In one embodiment, data capture and analysis module 342 compares the probability determined at block 510 to the threshold determined at block 515. If the first value representing the probability is not greater than the first threshold, at block 525, method 500 keeps the first data set in long-term storage. 260A. Instead, data capture and analysis module 342 may wait until a specific request to access Data Set 1 is received before retrieving Data Set 1 from long-term storage 260A.

If the first value representing the probability is greater than the first threshold, at block 530, method 500 retrieves the first data set from long-term storage 260A and loads the first data set into memory 250A on the host machine 210A in advance of the first time. In one embodiment, storage interface module 344 may receive instructions from data capture and analysis module 342 and in response, may identify Data Set 1 in long-term storage 260A. Storage interface module 344 may load Data Set 1 into memory 250A in advance of the predicted load time to ensure that the data set is available in memory 250A when requested by customer process 230A.

At block 535, method 500 determines a second value representing a probability that the customer process will not access the first data set for a threshold period of time after a second time. In one embodiment, data capture and analysis module 342 analyzes the previous data usage activities, using machine learning, to determine when customer process230A is likely to no longer access Data Set 1 as well as a probability that customer process 230A will in fact stop accessing Data Set 1 at that time. Additional details of the machine learning process used for probability determination are provided below with respect to FIG. 6.

At block 540, method 500 determines a second threshold according to one or more load conditions on the host machine at the second time. In one embodiment, data capture and analysis module 342 maintains a threshold defining how high the probability value should be before a corresponding data set is unloaded from memory 250A back to long term storage 260A. In one embodiment, the threshold is defined according to one or more load conditions on host machine 210A. By this time, the threshold determined at block 515 may have changed to accommodate for different load conditions on the storage node. In one embodiment, there may be a threshold used for unloading containers that is completely separate from the threshold used for loading containers.

At block 545, method 500 determines whether the second value representing the probability is greater than the second threshold. In one embodiment, data capture and analysis module 342 compares the probability determined at block 535 to the threshold determined at block 540. If the second value representing the probability is not greater than the second threshold, at block 550, method 500 keeps the first data set in memory. Instead data capture and analysis module 342 may wait until the first data set is targeted for eviction from memory 250A according to a corresponding eviction policy (e.g., least recently used, first in first out, etc.).

If the second value representing the probability is greater than the second threshold, at block 555, method 500 stores the first data set in long-term storage at the second time. In one embodiment, storage interface module 344 may receive instructions from data capture and analysis module 342 and in response, may identify Data Set 1 in memory 250A. In one embodiment, storage interface module 344 unloads Data Set 1 from memory 250A back into long term storage 260A. If any changes were made to Data Set 1 while Data Set 1 was stored in memory 250A, those changes may be maintained in the version of Data Set 1 stored in long-term storage 260A.

Figure 6:
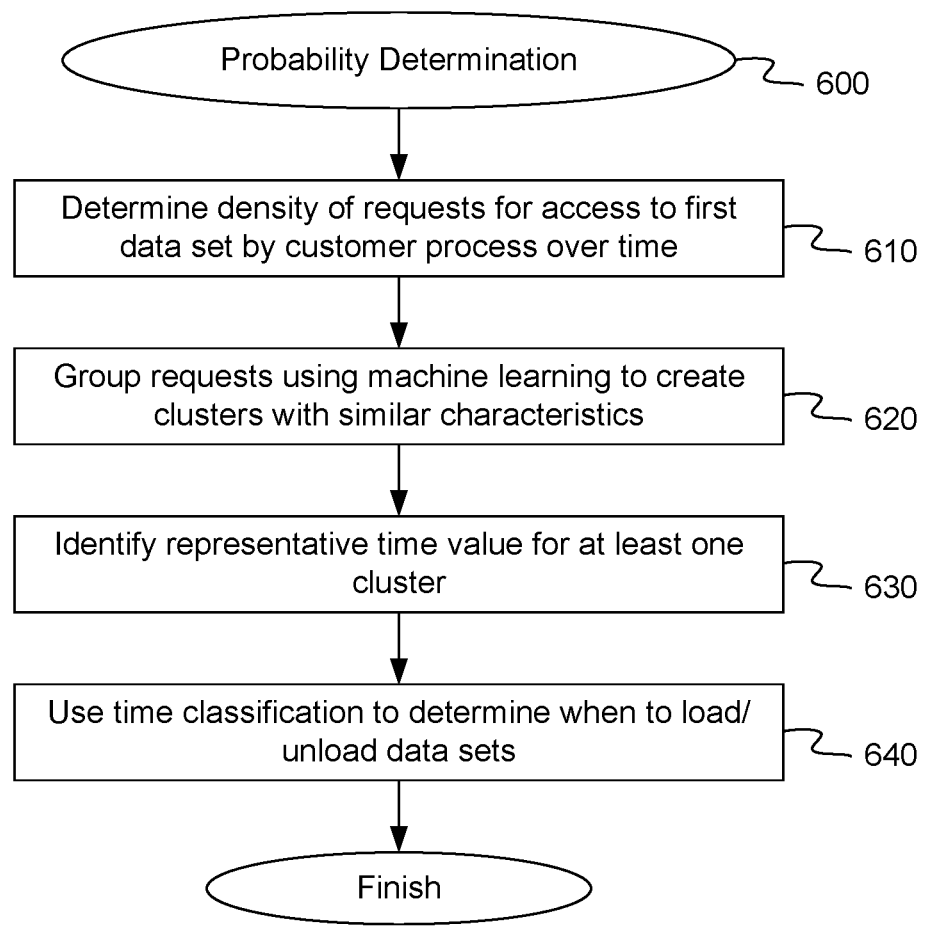
FIG. 6 is a flow diagram illustrating a method of determining a probability that a data set will be loaded or unloaded in memory at a given time, according to an embodiment.

FIG. 6 is a flow diagram illustrating a method of determining a probability that a data set will be loaded or unloaded in memory at a given time, according to an embodiment. The method 600 may be performed by processing logic that comprises hardware (e.g., circuitry, dedicated logic, programmable logic, microcode, etc.), software, firmware, or a combination thereof. The processing logic is configured to calculate a probability that a prediction of when a customer process will request to access a data set is correct. In one embodiment, method 600 may be performed by prediction logic 240, as shown in FIG. 3.

At block 610, method 600 determines a density of requests for access to the first data set by the customer process over time. In one embodiment, data capture and analysis module 342 maintains a log of all data access requests for a particular data set by a given customer process and can arrange those requests in time order. In one embodiment, the requests can be arranged by the time of day in which they were received. The requests can optionally be further filtered by day of the week.

At block 620, method 600 groups the requests using machine learning to create a plurality of clusters that each include requests within a different time period. In one embodiment, data capture and analysis module 342 groups the requests into clusters based on a similarity of particular metadata characteristics. Some examples of the characteristics used in clustering may include times when previous requests for the first data set were made, times when queries were submitted against the first data set, times representing how long the queries took to execute, or the like. Data capture and analysis module 342 may use one of a various unsupervised machine learning techniques such as a cluster analysis algorithm or a self-organizing map to group the request into clusters. The resulting clusters may be representative of the times at which a particular data set is most often or likely to be requested.

At block 630, method 600 identifies a representative time value for at least one of the plurality of clusters, the representative time value comprising the first time. In one embodiment, data capture and analysis module 342 selects one or more example requests from a certain cluster. The requests may be randomly selected or a certain sampling technique may be used, such as reservoir sampling. In one embodiment, data capture and analysis module 342 may receive an indication of a time classification of the subset of requests from a user, an administrator or other individual. For example, the administrator may examine the subset of requests and determine an applicable time classification. In one embodiment, data capture and analysis module 342 may implement a supervised machine learning process to generate a learned classifier function, based on the received time classification of the example requests, and use this function to classify the remaining requests. In another embodiment, the learned classifier function may be generated from other requests having known time classifications.

In one embodiment, the clustering and classification processes result in an indication of a probability that any particular requests belongs to a given time period classification. Accordingly, one individual request may have a certain probability of belonging to multiple classifications (e.g., 58% that it is part of a first group and 42% that it is part of a second group). In one embodiment, data capture and analysis module 342 may use an adjustable threshold to make the determination of which classification a certain request should belong to. In one example, this threshold may be set at 55%, meaning that the request in the example above would be classified as part of the first group. In another example, the threshold may be set at 40%, meaning that the request in the example above would be classified as part of both the first group and the second group. The group to which the request is assigned may have a representative time value which indicates the time at which requests for the corresponding data set are most likely to be received.

At block 640, method 600 uses the time period classification to determine when to load or unload the corresponding data set. Details of predictive loading and unloading are provided above with respect to FIGS. 4 and 5, and below with respect to FIG. 7.

Figure 7:
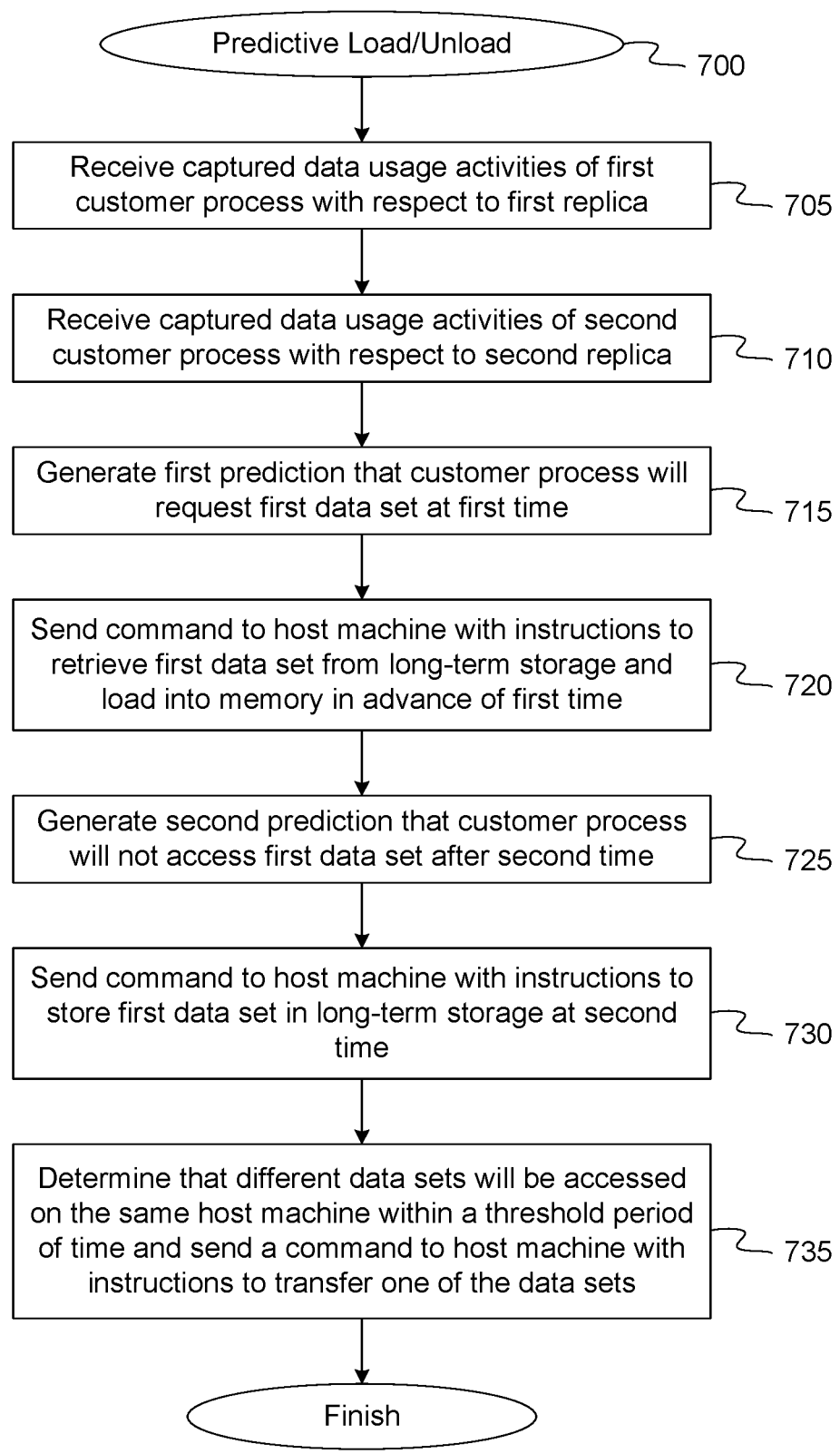
FIG. 7 is a flow diagram illustrating predictive loading and unloading of customer data in memory by a management node, according to an embodiment.

FIG. 7 is a flow diagram illustrating predictive loading and unloading of customer data in memory by a management node, according to an embodiment. The method 700 may be performed by processing logic that comprises hardware (e.g., circuitry, dedicated logic, programmable logic, microcode, etc.), software, firmware, or a combination thereof. The processing logic is configured to predictively load a data set from long term storage into memory before a corresponding customer process will request to access the data set and to unload the data set from memory back into long term storage once it is predicted that the customer process will no longer utilize the data set for some period of time. In one embodiment, method 700 may be performed by prediction logic 240 running on management node 270, as shown in FIG. 3.

Referring to FIG. 7, at block 705, method 700 receives captured data usage activities of a first customer process, running on a first host machine, with respect to a first replica of a data set stored on the first host machine. In one embodiment, management node/agent interface module 346 may receive captured data usage activities of customer processes 230A from an agent running on host machine 210A. At block 710, method 700 receives captured data usage activities of a second customer process, running on a second host machine, with respect to a second replica of the data set stored on the second host machine. In one embodiment, management node/agent interface module 346 may receive captured data usage activities of customer processes 230B from an agent running on host machine 210B. As described above, the previous data usage activities may include times when previous requests for data sets were made, times when queries were submitted against the data sets, times representing how long the queries took to execute, etc.

At block 715, method 700 generates a first prediction based on the captured data usage activities, the first prediction indicating that the first customer process will request access to the first data set at a first time. In one embodiment, data capture and analysis module 342 generates analyzed customer process data 374 which includes a load time, when a certain customer process 230A will likely request access to a particular data set stored in long-term storage 260A on host machine 210A. The prediction may further include a value indicating a probability that the prediction is correct. In one embodiment, the prediction is based on the previous data usage activities of the customer process with respect to one or more replicas of the same data set across one or more host machines storing the replicas.

At block 720, method 700 sends a first command to the first host machine, the first command instructing the first host machine to retrieve the first data set from long-term storage and load the first data set into memory on the host machine in advance of the first time. In one embodiment, management node/agent interface module 346 sends the command to the agent on host machine 210A. In response, storage interface module 344 may identify Data Set 1 in long-term storage 260A and load Data Set 1 into memory 250A in advance of the predicted load time.

At block 725, method 700 generates a second prediction based on the captured data usage activities, the second prediction indicating that the first customer process will not request access to the first data set for a threshold period of time after a second time. In one embodiment, analyzed customer process data 374 further includes an unload time, when customer process 230A will likely stop requesting access to a particular data set in memory 250A. The prediction may further include a value indicating a probability that the prediction is correct. As described above, the prediction is based on the previous data usage activities of the customer process.

At block 730, method 700 sends a second command to the first host machine, the second command instructing the first host machine to store the first data set in the long-term storage at the second time. In one embodiment, management node/agent interface module 346 sends the command to the agent on host machine 210A. In response, storage interface module 344 may identify Data Set 1 in memory 250A and unload Data Set 1 from memory 250A back into long term storage 260A.

At block 735, method 700 receives captured data usage activities of a third customer process, running on the first host machine 210A, with respect to a second data set (Data Set 2) stored on the first host machine 210A. Data Capture and analysis module 342 may generate a third prediction based on the captured data usage activities with respect to the second data set, the third prediction indicating that the third customer process will request access to the second data set at a third time. In one embodiment, data Capture and analysis module 342 compares the third time to the first time when the first customer process will access Data set 1 on host machine 210A. If the third time is within a threshold period of the first time, meaning that separate customer processes are likely to access corresponding data sets at approximately the same or similar times, there may be insufficient resources to service both customer processes within the terms of the service level agreement. Accordingly, in one embodiment, management node/agent interface module 346 and sends a third command to the first host machine 210A, the third command instructing the first host machine 210A to transfer the second data set from the first host machine 210A to a third host machine. By achieving a balance of data sets that are likely to be accessed at different times on each host machine, the use of hardware resources can be optimized.

Figure 8:
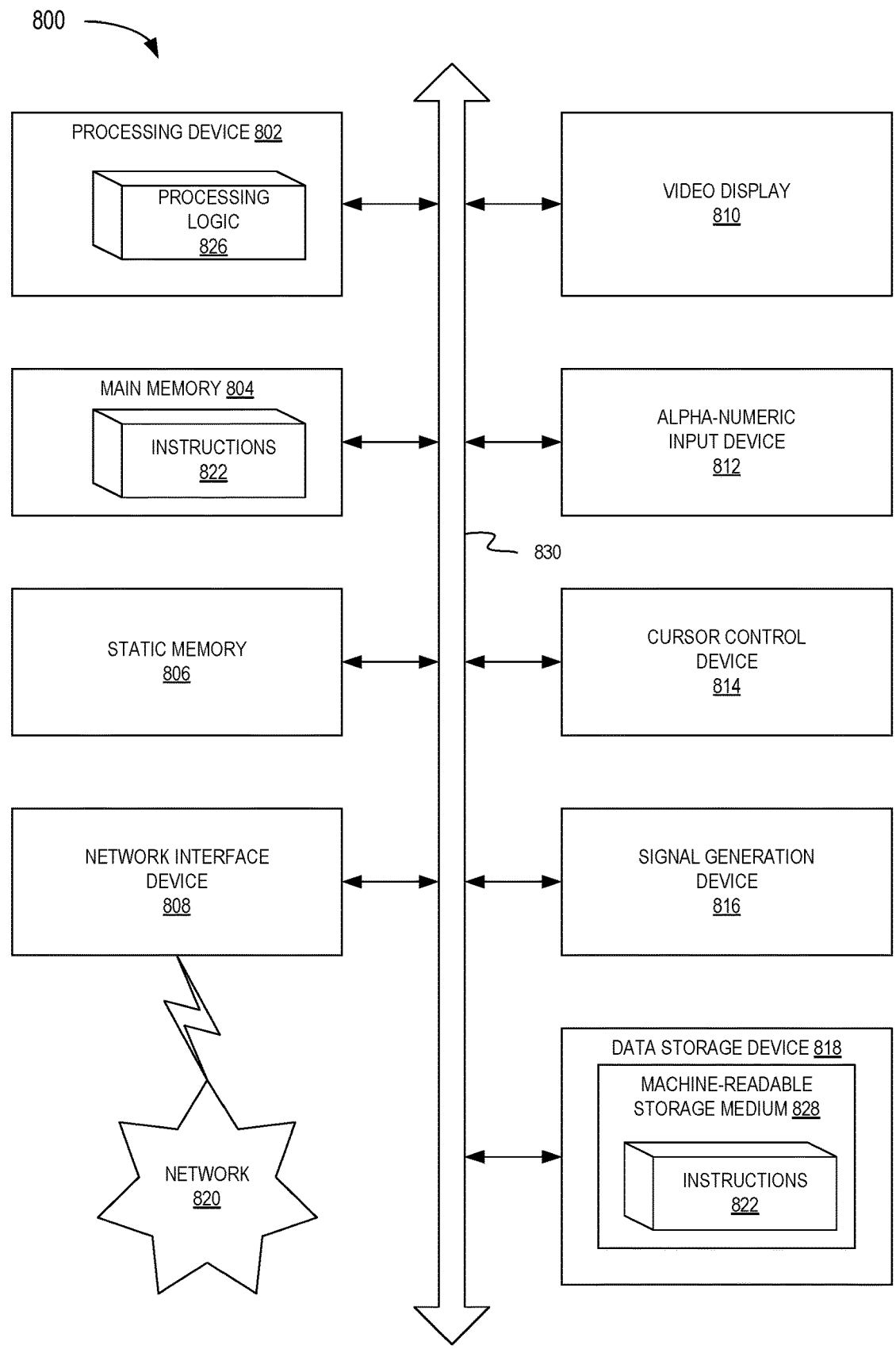
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a computing device, such as host machines 210A-210B, management node 270 or client devices 205A-205N.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808.

The machine-readable storage medium 828 may also be used to store instructions for predictive loading and unloading of customer data in memory, as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
analyzing previous data usage activities of a plurality of customer processes running on respective host machines with respect to a plurality of replicas of a first data set stored on the respective host machines to generate a first prediction indicating that a customer process, running on a host machine, will request the first data set at a first time, the first prediction having an associated first probability that the customer process will request the first data set at the first time;
comparing the associated first probability that the customer process will request the first data set at the first time to a first threshold, wherein the first threshold is variable according to one or more load conditions on the host machine, a timing of the comparing, and a priority level of the first data set;
responsive to the associated first probability that the customer process will request the first data set at the first time being greater than the first threshold, retrieving the first data set from long-term storage;
loading the first data set into memory on the host machine in advance of the first time at which the customer process is predicted to request the first data set;
providing the customer process with access to the first data set in the memory during a period between the first time and a second time;
generating a second prediction indicating that the customer process will not access the first data set for a threshold period of time after the second time, the second prediction having an associated second probability that the customer process will not access the first data set for the threshold period of time after the second time;
comparing the associated second probability that the customer process will not access the first data set for the threshold period of time after the second time to a second threshold, wherein the second threshold is different than the first threshold; and
responsive to the associated second probability that the customer process will not access the first data set for the threshold period of time after the second time being greater than the second threshold, storing the first data set in the long-term storage at the second time.

2. The method of claim 1, wherein analyzing the previous data usage activities comprises analyzing at least one of times when previous requests for the first data set were made, times when queries were submitted against the first data set, or times representing how long the queries took to execute.

3. The method of claim 1, further comprising:
generating a third prediction indicating that the customer process will request a second data set at a third time;
retrieving the third data set from the long-term storage;
loading the third data set into the memory on the host machine in advance of the third time.

4. A host machine comprising:
a processing device; and
memory to store computer-executable instructions that, if executed, cause the processing device to:
determine a first value representing a probability that a customer process, running on the host machine, will access a first data set at a first time, wherein the first value is based on previous data usage activities of a plurality of customer processes running on respective host machines with respect to a plurality of replicas of the first data set stored on the respective host machines;
compare the first value representing the probability that the customer process will request the first data set at the first time to a first threshold, wherein the first threshold is variable according to one or more load conditions on the host machine, a timing of the comparing, and a priority level of the first data set;
determine that the first value representing the probability that the customer process will access the first data set at the first time is greater than the first threshold;
retrieve the first data set from long-term storage;
load the first data set into the memory on the host machine in advance of the first time at which the customer process is predicted to access the first data set;
determine a second value representing a probability that the customer process will not access the first data set for a threshold period of time after a second time;
determine that the second value is greater than a second threshold, wherein the second threshold is defined according to one or more load conditions on the host machine at the second time and is different than the first threshold; and store the first data set in the long-term storage at the second time.

5. The host machine of claim 4, wherein the instructions further cause the processing device to:
    capture the previous data usage activities of the plurality of customer processes with respect to the plurality of replicas of first data set; and
    analyze the previous data usage activities to determine the first value.

6. The host machine of claim 5, wherein the previous data usage activities comprise at least one of times when previous requests for the first data set were made, times when queries were submitted against the first data set, or times representing how long the queries took to execute.

7. The host machine of claim 4, wherein the load conditions on the host machine comprise at least one of a day of the week, a time of day, a number of customer processes being executed on the host machine, or a volume of queries submitted on the host machine.

8. The host machine of claim 4, wherein to determine the first value, the processing device to:
    determine a density of requests for access to the first data set by the customer process over time;
    group the requests using machine learning to create a plurality of clusters that each include requests within a different time period; and
    identify a representative time value for at least one of the plurality of clusters, the representative time value comprising the first time.

9. A non-transitory computer-readable storage medium having stored therein instructions which, if executed by a processing device, cause the processing device to:
    receive captured data usage activities of a first customer process, running on a first host machine, with respect to a first replica of a first data set stored on the first host machine and of a second customer process, running on a second host machine, with respect to a second replica of the first data set stored on the second host machine;
    generate a first prediction based on the captured data usage activities with respect to the first and second replicas of the first data set, the first prediction indicating that the first customer process will request access to the first data set at a first time, the first prediction having an associated first probability that the first customer process will request access to the first data set at the first time; and
    compare the associated first probability that the first customer process will request access to the first data set at the first time to a first threshold, wherein the first threshold is variable according to one or more load conditions on the first host machine, a timing of the comparing, and a priority level of the first data set;
    responsive to the associated first probability that the first customer process will request access to the first data set at the first time being greater than the first threshold, send a first command to the first host machine, the first command instructing the first host machine to retrieve the first data set from long-term storage and load the first data set into memory on the host machine in advance of the first time at which the first customer process is predicted to request the first data set;
    generate a second prediction based on the captured data usage activities, the second prediction indicating that the first customer process will not request access to the first data set for a threshold period of time after a second time, the second prediction having an associated second probability that the customer process will not request access to the first data set for the threshold period of time after the second time;
    compare the associated second probability that the customer process will not request access to the first data set for the threshold period of time after the second time to a second threshold, wherein the second threshold is different than the first threshold; and
    responsive to the associated second probability that the customer process will not request access to the first data set for the threshold period of time after the second time being greater than the second threshold, send a second command to the first host machine, the second command instructing the first host machine to store the first data set in the long-term storage at the second time.

10. The non-transitory computer-readable storage medium of claim 9, wherein to generate the first prediction, the processing device to:
    determine a density of requests for access to the first data set by the first customer process over time;
    group the requests using machine learning to create a plurality of clusters that each include requests within a different time period; and
    identify a representative time value for at least one of the plurality of clusters, the representative time value comprising the first time.

11. The non-transitory computer-readable storage medium of claim 10, wherein to group the requests, the processing device to apply at least one of a cluster analysis algorithm or a self-organizing map to the requests.

12. The non-transitory computer-readable storage medium of claim 9, wherein the instructions further cause the processing device to:
    receive captured data usage activities of a third customer process, running on the first host machine, with respect to a second data set stored on the first host machine; and
    generate a third prediction based on the captured data usage activities with respect to the second data set, the third prediction indicating that the third customer process will request access to the second data set at a third time.

13. The non-transitory computer-readable storage medium of claim 12, wherein the instructions further cause the processing device to:
    determine that the third time is within a threshold period of the first time; and send a third command to the first host machine, the third command instructing the first host machine to transfer the second data set from the first host machine to a third host machine.

* * * * *